United States Patent [19]
Matsushima et al.

[11] Patent Number: 6,016,518
[45] Date of Patent: *Jan. 18, 2000

[54] AUTOMATIC MASTER/SLAVE DESIGNATION FOR COMPUTER PERIPHERALS

[75] Inventors: Shinji Matsushima, Kawasaki; Mitsuhiro Yamazaki, Sagamihara, both of Japan

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/753,854

[22] Filed: Dec. 3, 1996

[30] Foreign Application Priority Data

Mar. 22, 1996 [JP] Japan .................................. 8-3015959

[51] Int. Cl.⁷ .................................................... G06F 13/00
[52] U.S. Cl. .................................. 710/8; 710/11; 710/14; 710/208; 710/209
[58] Field of Search .................................... 395/828, 830, 395/831, 834, 290, 200.38, 200.39, 200.4, 200.41, 200.58; 710/8, 10, 11, 14, 110; 709/208, 209, 210, 211, 228

[56] References Cited

U.S. PATENT DOCUMENTS

| | | | |
|---|---|---|---|
| 5,457,785 | 10/1995 | Kikinis et al. | 395/308 |
| 5,471,590 | 11/1995 | Melo et al. | 395/288 |
| 5,483,419 | 1/1996 | Kaczeus, Sr. et al. | 361/685 |
| 5,506,997 | 4/1996 | Maguire et al. | 395/800 |
| 5,519,882 | 5/1996 | Asano et al. | 395/830 |
| 5,524,235 | 6/1996 | Larson et al. | 395/478 |
| 5,535,400 | 7/1996 | Belmont et al. | 395/750 |
| 5,559,968 | 9/1996 | Stancil et al. | 395/306 |
| 5,561,772 | 10/1996 | Dornier et al. | 395/281 |
| 5,649,233 | 7/1997 | Chen | 395/828 |
| 5,666,557 | 9/1997 | Cassidy et al. | 395/828 |

FOREIGN PATENT DOCUMENTS 7-160378  6/1995  Japan .................................. G06F 3/00

*Primary Examiner*—Ayaz R. Sheikh
*Assistant Examiner*—Ario Etienne
*Attorney, Agent, or Firm*—G. Marlin Knight

[57] ABSTRACT

The present invention provides an apparatus that automatically designates a peripheral device as either a master or slave in response to the peripheral device connections when power is turned on. The apparatus comprises first and second connectors coupled to a master/slave designation means which provides a control signal to designate a peripheral device as a master.

9 Claims, 4 Drawing Sheets

AUTOMATIC MASTER/SLAVE DESIGNATION FOR COMPUTER PERIPHERALS

FIELD OF THE INVENTION

The present invention relates to an information processing apparatus that can connect a plurality of peripheral devices, and in particular, to an information processing apparatus that can connect a plurality of peripheral devices and designate a peripheral device as either a master or slave.

BACKGROUND OF THE INVENTION

In accordance with recent technical developments, various types of personal computers (PCS), such as desktop and notebook PCS, are being produced and sold on the market. Essentially, a computer comprises a central processing unit (CPU) and a memory. The CPU reads, as needed, necessary data and programs from the memory, executes a desired program, manipulates the data, and writes the results to the memory. Typically, the memory is made of volatile semiconductor devices, such as DRAM. Volatile memory is relatively expensive, and memory capacity is substantially limited from a few to several tens of megabytes. To increase memory capacity, computer systems add a nonvolatile external memory device with a large storage capacity. Currently, hard disk drives (HDD) are one of the more popular external memory devices. From 1993 to 1994, the density and access rate of HDDs has improved, and HDDs having a storage capacity of one gigabyte are available at low cost.

An HDD comprises a storage medium, e.g. a hard disk, a read/write head, a spindle motor that rotates the storage medium, and a circuit board. The circuit board comprises a controller, a connector, and read/write, head positioning, motor driving, and interface circuits. The controller controls the circuits. The connector connects the HDD to the interface board of a personal computer (PC). The Integrated Device Electronics (IDE) interface is a defacto standard interface for connecting HDDs to PCS. An HDD that conforms to the IDE standard will be referred to as an "IDE_HDD." An HDD can be directly connected to a system bus of a PC, e.g., an Industry Standard Architecture (ISA) bus using the IDE with only a buffer therebetween.

As is well-known to those of ordinary skill in the art, the IDE standard allows two HDDs to connect to a single interface board. When two HDDs are connected, one HDD serves as a master HDD while the other HDD serves as a slave HDD. An HDD is designated as a master or a slave by providing a control signal, e.g. "-M/S," to each of the connected IDE_HDDs. When the -M/S control signal is in a low-level state, the IDE_HDD acknowledges itself as a master HDD. When the -M/S control signal is in a high-level state, the IDE_HDD acknowledges itself as a slave HDD. The master IDE_HDD sets a predetermined flag in its control register to "0", e.g., "DRV" which is the fourth bit of a "Drive/Head register," while a slave IDE_HDD sets the DRV flag to "1". The PC uses DRV to switch the access to either the master or the slave. The master/slave relationship results from the restrictions imposed by the computer architecture. When multiple HDDs are connected to the interface board of a PC, the HDDs must share a single I/O space, i.e., each HDD does not have its own I/O port.

To maintain compatibility with older IDE devices, two requirements must be met. First, the PC acknowledges the presence of the slave HDD only via the master HDD. Second, the master and slave are designated when the PC is powered on, and once designated, the designation can not be changed until the PC is powered off.

Conventionally, a jumper plug is used to designate an IDE_HDD as a master or a slave, for example U.S. Pat. No. 5,519,882. The jumper plug short circuits the connecter pins of the IDE_HDD. Therefore, when the IDE_HDD is connected to the interface board of a PC, the -M/S control signal of each HDD has a designated potential, e.g. a low level or a high level.

The method of designating a master and slave using a jumper plug is relatively easy and inexpensive. For example, a manufacturer can set the jumper plug, and mount the HDD on a machine before shipping. Alternatively, the user may set the jumper plug after purchasing an HDD. Typically, jumper plugs are acceptable for larger PCS, such as desktop PCS, because the HDD is mounted once in the machine. However, since the user sets the jumper pins during installation, the method is undesirable when HDDs are frequently installed and removed. Because notebook PCS are compact and have a small number of ports, peripheral devices are frequently exchanged. Therefore, a jumper plug is not desirable.

Another method does not use jumper plugs, but designates default master and slave IDE connectors. A -M/S pin for the master IDE connector is set to a low level (grounded), while the -M/S pin for the slave IDE connector is set to a high level. For example, in the "IBM ThinkPad 755" ("ThinkPad" is a trademark of IBM Corp.), an IDE connector is mounted on the body of the PC and is fixed as the master.

Some notebook PCs can connect to a docking station. The main feature of a docking station is to provide the same working environment as a desktop PC, when using a notebook computer in an office. A docking station is also called an "expansion box" or an "expansion unit". For a notebook computer, the primary function of a docking station is to expand a bus to provide an additional bus slot. With bus expansion, the notebook computer can use a second IDE_HDD.

When the "ThinkPad 755" is mounted in the "IBM Docking Station," the IDE connector on the docking station is fixed as a slave. The method assumes that an HDD is always installed in the PC body. The method has the advantage that the user does not have to set a jumper plug prior to use, and works especially well as long as a master HDD is always installed. However, because peripheral devices are now frequently exchanged, the disadvantages have become apparent.

When peripheral devices are frequently replaced, sometimes users mistakenly attach the HDDs only to the slave connectors. Moreover, a design which presets the connector in the PC body as master is not acceptable when an HDD is mounted in a docking station and no HDD is installed in the body of the PC or another storage device is mounted. Because the PC can not acknowledge the presence of a slave HDD without an intervening master HDD, a slave HDD that can not be acknowledged is merely excess baggage.

The master and slave IDE_HDDs must be designated during an initialization routine when the power is turned on because only the master HDD communicates with the PC (I/O accesses). The slave HDD can not independently communicate with the PC. Therefore, if the PC fails to designate a master and a slave when power is turned on, software cannot correct the designation after the initialization routine ends.

Furthermore, if the master and slave are designated with jumper plugs, problems occur when HDDs are frequently replaced. For example, two master HDDs may be simultaneously connected, or only a slave HDD may be connected.

In the former case, the master HDDs conflict with each other in the I/O space, and therefore the system security deteriorates. In the latter case, the PC does not even acknowledge the presence of the connected HDD. Therefore, in both cases, the HDDs are merely excess baggage.

SUMMARY OF THE PRESENT INVENTION

It is an object of the present invention to provide an apparatus for information processing that connects a plurality of hard disk drives.

It is another object of the present invention to provide an apparatus for information processing that connects a plurality of hard disk drives as either masters or slaves using a control signal.

It is yet another object of the present invention to provide an apparatus for information processing that automatically and accurately designates hard disk drives as either a master or a slave without placing an additional burden on a user.

It is a further object of the present invention to provide an information processing apparatus that automatically and accurately designates hard disk drives as either masters or slaves in response to the connection context when power is on.

To achieve the above objects, a first embodiment of the present invention comprises first and second connectors and a master/slave designation means. The master/slave designation means is coupled to the first and the second connectors, and provides a control signal to designate a first peripheral device as master.

In a second embodiment of the present invention, an information processing apparatus comprises first and second connectors and a master/slave designation means. The first and second connectors are for connecting a hard disk drive either as a master or slave. The master/slave designation means provides a control signal to designate the hard disk drive connected to the second connector as master, only when the second connector is connected to a hard disk drive.

In a third embodiment of the present invention, an information processing apparatus comprises first and second connectors, and a master/slave designation means. The first and second connectors are for connecting a hard disk drive that is driven as either a master or slave. The master/slave designation means provides a control signal to designate only the hard disk drive connected to the first connector as master, when hard disk drives are connected to both connectors.

In a fourth embodiment of the present invention, an information processing apparatus comprises first and second connectors, and a master/slave designation means. The first and second connectors connect a hard disk drive that is driven either as a master or slave. The master/slave designation means provides a control signal to designate the hard disk drive connected to the first connector as master, when the first connector is connected to a hard disk drive, and provides a control signal to designate a hard disk drive connected to the second connector as a slave, when the second connector is connected to a hard disk drive.

In a fifth embodiment of the present invention, an information processing apparatus installs hard disk drives to serve as a master or slave in response to a voltage level on a master/slave control pin. A first connector, for connecting a hard disk drive, comprises a plurality of connector pins including a first master/slave control pin. The first master/slave control pin is maintained at a first voltage level to designate a hard disk drive as a master. A second connector, for connecting a hard disk drive, comprises a plurality of connector pins including a second master/slave control pin. The voltage level on the second master/slave pin changes if a hard disk drive is connected to the first connector.

In a sixth embodiment of the present invention, an information processing apparatus installs hard disk drives to serve as a master or slave in response to a voltage level on a master/slave control pin. A first connector, for connecting a hard disk drive, comprises a plurality of connector pins including a first master/slave control pin. The first master/slave control pin is maintained at a first voltage level to designate a hard disk drive as a master. A second connector, for connecting a hard disk drive, comprises a comprises a plurality of connector pins including a second master/slave control pin. The second master/slave control pin is maintained at a first voltage level when no hard disk drive is connected to the first connector. When a hard disk drive is connected to the first connector, the second master/slave control pin is maintained at a second voltage level to designate the hard disk drive connected to the second connector as a slave.

In a seventh embodiment of the present invention, an information processing apparatus connects hard disk drives to serve as a master or a slave in response to a voltage level on a master/slave control pin. A first connector, for connecting a hard disk drive, comprises a plurality of one connector pins including a first master/slave control pin. The first master/slave control pin is maintained at a first voltage level to designate a hard disk drive as a master. A second connector, for connecting a hard disk drive, comprises a plurality of connector pins including a second master/slave control pin. The second master/slave control pin is maintained either at a first voltage level to designate the hard disk drive as a master, or at a second voltage level, to designate the hard disk drive as a slave. The master/slave designation means maintains the second master/slave control pin at the second voltage level when a hard disk drive is connected to the first connector, and maintains the second master/slave control pin at the first voltage level when no hard disk drive is connected to the first connector.

In an eighth embodiment of the present invention, an information processing apparatus comprises first and second connectors, and master/slave designation means. The first and second connectors are for connecting a peripheral device that is driven either as a master or slave. The master/slave designation means provides a control signal to designate the peripheral device connected to the first connector as master, when only the first connector is connected to the peripheral device.

In a ninth embodiment of the present invention, an information processing apparatus comprises first and second connectors, and master/slave designation means. The first and second connectors are for connecting a peripheral device to be driven either as a master or as a slave. The master/slave designation means provides a control signal to designate the peripheral device connected to the second connector as master, when only the second connector is connected to a peripheral device.

In a tenth embodiment of the present invention, an information processing apparatus comprises first and second connectors, and master/slave designation means. The first and second connectors are for connecting a peripheral device that is driven as a master and as a slave. The master/slave designation means provides a control signal to designate only the peripheral device connected to the first connector as master, when peripheral devices are connected to both connectors.

In an eleventh aspect of the present invention, an information processing apparatus comprises first and second connectors, and master/slave designation means. The first and second connectors are for connecting a peripheral device that is driven either as a master or as a slave. The master/slave designation means provides a control signal, that designates as master, to the peripheral device connected to the first connector when only the first connector connects the peripheral device, and also provides a control signal to designate the peripheral device connected to the second connector as master, when only the second connector connects a peripheral device.

In a twelfth embodiment of the present invention, an information processing apparatus installs peripheral devices to serve as a master or slave in response to a voltage level on a master/slave control pin. A first connector, for connecting a peripheral device, comprises a plurality of connector pins including a first master/slave control pin. The first master/slave control pin is maintained at a first voltage level for designating the peripheral device as a master. A second connector, for connecting the peripheral device, comprises a plurality of connector pins including a second master/slave control pin. The voltage level on the second master/slave pin being in responsive to whether a peripheral device is connected to the first connector.

In a thirteenth embodiment of the present invention, an information processing apparatus installs peripheral devices to serve as a master or slave in response to a voltage level on a master/slave control pin. A first connector, for connecting a peripheral device, comprises a plurality of connector pins including a first master/slave control pin. The first master/slave control pin is maintained at a first voltage level to designate the peripheral device as a master. A second connector, for connecting a peripheral device, comprises a plurality of connector pins including a second master/slave control pin. The second master/slave control pin is maintained at a first voltage level when no peripheral device is connected to the first connector. The second master/slave control pin is maintained at a second voltage level to designate a peripheral device as a slave when a peripheral device is connected to the first connector.

In a fourteenth embodiment of the present invention, an information processing apparatus installs peripheral devices to serve as a master or slave in response to a voltage level on a master/slave control pin. A first connector, for connecting a peripheral device, comprises a plurality of connector pins including a first master/slave control pin. The first master/slave control pin is maintained at a first voltage level to designate the peripheral device as a master. A second connector, for connecting a peripheral device, comprises a plurality of connector pins including a second master/slave control pin. The second master/slave control pin is maintained either at a first voltage level, to designate the peripheral device as a master, or at a second voltage level, to designate the peripheral device as a slave. A master/slave designation means maintains the second master/slave control pin at the second voltage level when a peripheral device is connected to the first connector, and maintains the second master/slave control pin at the first voltage level when no peripheral device is connected to the first connector.

In a fifteenth aspect of the present invention, an information processing apparatus installs hard disk drives to serve as a master or a slave in response to the state of a master/slave control pin. The master/slave control pin is set to a first voltage level to designate a hard disk drive as a master, and to a second voltage level to designate a hard disk drive as a slave. A first connector, for connecting a hard disk drive, comprises a plurality of connector pins including a first master/slave control pin. A second connector, for connecting a hard disk drive, comprises a plurality of connector pins including a second master/slave control pin. A master/slave designation means maintains the first master/slave control pin at the first voltage level, maintains the second master/slave control pin at the second voltage level when a hard disk drive is connected to the first connector, and maintains the second master/slave control pin at the first voltage level when no hard disk drive is connected to the first connector.

In a sixteenth embodiment of the present invention, an information processing apparatus installs hard disk drives to serves as a master or slave in response to a master/slave control pin. The master/slave control pin is set to a first voltage level to designate a hard disk drive as a master, and to a second voltage level to designate a hard disk drive as a slave. A first connector, for connecting a hard disk drive, comprises a plurality of connector pins including a first master/slave control pin. The first master/slave control pin is maintained at the first voltage level. A second connector, for connecting a hard disk drive, comprises a plurality of connector pins including a second master/slave control pin. A detection means detects if a hard disk drive is connected to the first connector. A master/slave designation means maintains the second master/slave control pin at the second voltage level when a hard disk drive is connected to the first connector, and maintains the second master/slave control pin at the first voltage level when no hard disk drive is connected to the first connector.

An information processing apparatus according to the present invention has first and the second connectors for connecting hard disk drives. The present invention gives priority to the first connector to designate a master and slave.

If only one of the first and the second connectors is connected to a hard disk drive, the hard disk drive is automatically designated as a master. For example, if the hard disk drive is connected only to the first connector, the hard disk drive is designated as a master HDD by default, according to the first, the third through the eighth, and the tenth through sixteenth aspects. However, if a hard disk is connected only to the second connector, the hard disk drive is designated as a master HDD in response to the unused state of the first connecter, according to the second, the fourth through the seventh, the ninth, and the eleventh through the sixteenth aspects.

If hard disk drives are connected to both the first and the second connectors, then the hard disk drive connected to the first connector is designated as a master HDD because the first connector has priority, according to the third through the seventh and the tenth through sixteenth aspects. The hard disk connected to the second connector is designated as a slave HDD, according to the fifth through the seventh and the twelfth through the sixteenth aspects.

In short, the present invention automatically and accurately designates hard disk drives as masters or slaves in response to the connection context. Master/slave designation is automatically and accurately performed when power is turned on.

Furthermore, according to the present invention, since only one of the connected hard disk drives is designated as a master, no burden is placed on a user.

Other objects, features and advantages of the present invention will become apparent in the detailed description of the preferred embodiment while referring to the accompanying drawings.

DETAILED DESCRIPTION OF THE PREFERRED EMBODIMENTS

Figure 1A:
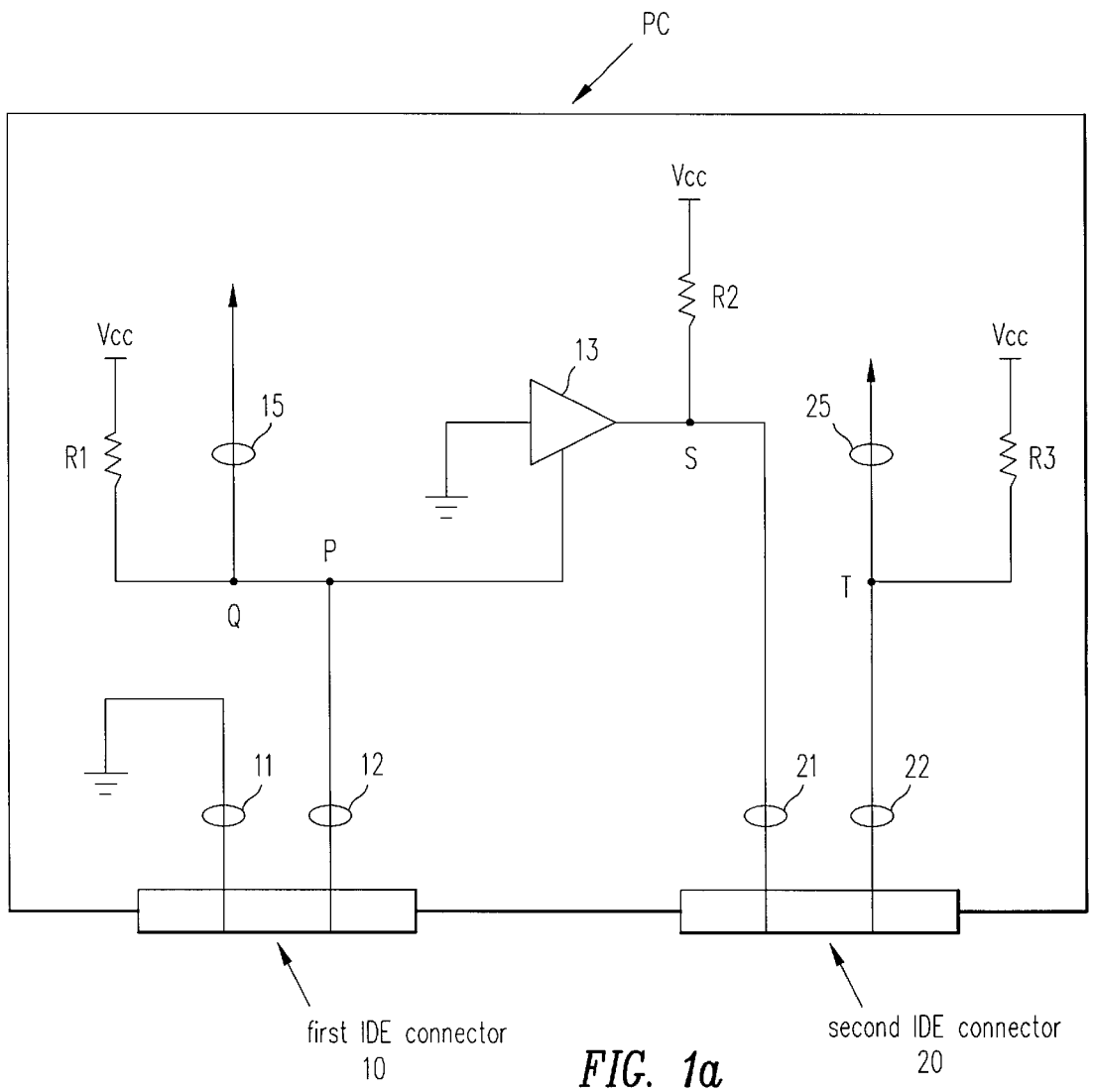
FIG. 1a is a schematic a PC in a first embodiment of the present invention.

The preferred embodiments of the present invention will now be described in detail while referring to the drawings.

A. Hardware

Figure 1B:
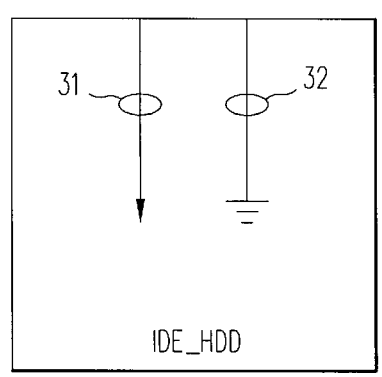
FIG. 1b is a schematic of an IDE connector.

FIGS. 1a and 1b are schematics of the IDE peripheral interface of a PC 100 and IDE_HDD 30 in a first embodiment of the present invention. The PC 100 has a first connector 10 and a second connector 20 for connecting IDE_HDDS. The connectors 10, 20 conform to the IDE standard, and comprise multiple connector pins. Both connectors 10, 20 include "–M/S" pins 11, 21 to designate a connected HDD as a master or slave, and "DETECT" pins 12, 22 to determine if an HDD is connected. An HDD is designated as a master when the HDD receives a –M/S signal of a low level (ground). An HDD is designated as a slave when the HDD receives a –M/S signal at a high level (open). When HDDs are connected to the connectors 10, 20, the connectors 10, 20 transmit a DETECT signal, a low level, to the PC to notify the PC that an HDD is connected. Note, the names and operation of the other pins of the IDE connector are not be described because the other pins are not related to the subject matter of the present invention.

The first –M/S pin 11 in the first connector 10 is grounded on the interface board. Therefore, if an HDD 30 is connected to the first connector 10, a low-level –M/S signal is transmitted to the HDD 30.

The first DETECT pin 12 in the first connector 10 is branched at point P. One of the branched ends of the first DETECT pin 12 is pulled up via a protection resistor R1 to a voltage $V_{CC}$, and the other branched end is connected to a control pin of a tristate buffer 13. The system retrieves a voltage level for the first DETECT pin 12 at point Q, and uses it as a first detection signal line 15 to confirm the presence of an HDD 30. If the HDD 30 is connected to the first connector 10, the first DETECT pin 12 is grounded via the HDD 30. Therefore, the first detection signal line 15 is pulled down and the buffer 13 is set to the tristate OFF condition. If the HDD 30 is not connected to the first connector 10, the first detection signal line 15 is pulled up by voltage $V_{CC}$ and the buffer 13 is set to the tristate ON condition.

The input terminal of the buffer 13 is grounded and the buffer's output terminal is pulled up via a protection resistor R2 to voltage $V_{CC}$. The output terminal branches at point S. One end of the branched line is connected to the second –M/S pin 21 of the second connector 20. If an HDD 30 is connected to the first connector 10, in response to the tristate OFF condition of the buffer 13, the second –M/S pin 21 is pulled up to a high level by voltage $V_{CC}$. If an HDD 30 is not connected to the first connector 10, in response to the ON condition of the buffer 13, the second –M/S pin 21 is set to a low level (ground).

The second DETECT pin 22 of the second connector 20 is pulled up via a protection resistor R3 by voltage $V_{CC}$. The system retrieves a voltage level for the second DETECT pin 22 at point T and uses it as a second detection signal line 25 to confirm the presence of the HDD 30. When the HDD 30 is connected to the second connector 20, the second DETECT pin 22 is grounded via the HDD 30, and the second detection signal line 25 is pulled down. When the HDD 30 is not connected to the second connector 20, the second detection signal line 25 is pulled up by voltage $V_{CC}$.

The PC 100 of the present embodiment has many other hardware components, such as a CPU, memory, and a system bus. Because the other hardware components are well-known to those of ordinary skill in the art and are not directly related to the subject matter of the present invention, the other hardware components will not be described.

In the present invention, the IDE_HDD 30 comprises, at a minimum, a storage medium, e.g. a hard disk, a read/write head, a spindle motor to rotate the hard disk, and a circuit board. The circuit board comprises, at a minimum, read/write, head positioning, motor driving, interface, and control circuitry. Because the aforementioned circuits are well-known and are not directly related to the subject matter of the present invention, the circuits are not shown.

The HDD 30 of the present invention conforms to the IDE standards, and the connector includes –M/S pin 31, a DETECT pin 32, and other pins to connect to connectors 10 and 20. The HDD 30 serves as a master or slave in response to the voltage level of the –M/S pin 31 when power is turned on. If the –M/S pin 31 is low, the HDD 30 serves as a master, and if the –M/S pin 31 is high, the HDD 30 serves as a slave. The DETECT pin 32 is grounded inside the HDD 30. When the HDD 30 is connected, the DETECT pin 12, 22 is at a low level.

The operation of the pins 31 and 32 is well-known and specified by the IDE standards. The HDD 30 conforms to the IDE standards and does not require a special change or a correction to its design to make the present invention.

B. Operation

Only the First Connector Is Connected to an HDD

Figure 2:
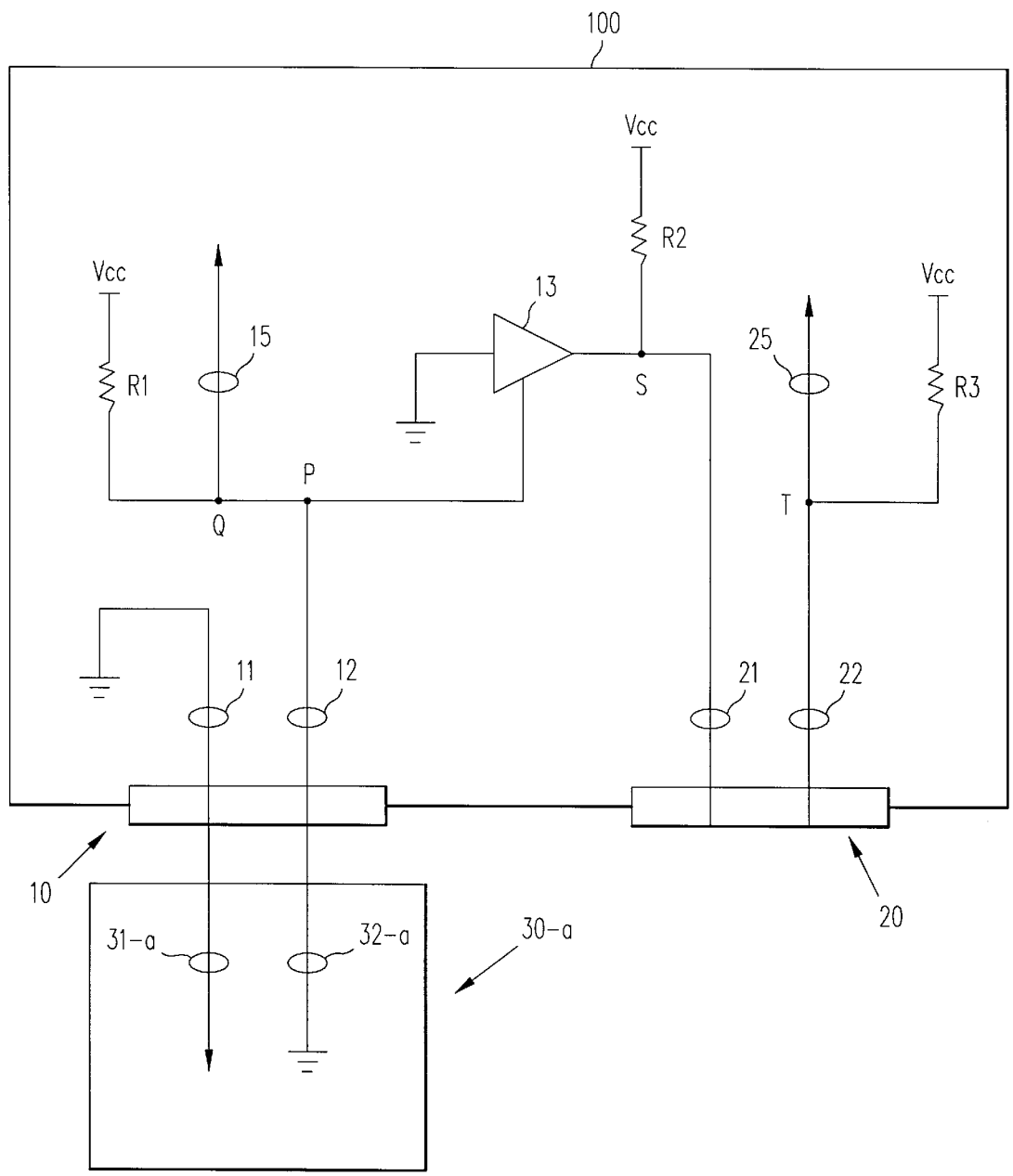
FIG. 2 is a schematic of the present invention when an HDD connected to the first IDE connector.

FIG. 2 is a schematic showing an HDD 30-a connected to the first IDE connector 10. When an HDD 30-a is connected to the first connector, the –M/S pin 31-a of the HDD 30-a is grounded via the first –M/S pin 11. Therefore, the HDD 30-a acknowledges itself as a master when the power is on. In other words, it is ensured that only the connected HDD 30-a is designated as master. The first DETECT pin 12 is also grounded via a DETECT pin 32-a. The first detection signal line 15 is set to a low level and the system detects the presence of the HDD 30-a at the first connector. Because no HDD is connected to the second connector 20, the second DETECT pin 22 is open. Therefore, the second detection signal line 25 is pulled up by voltage $V_{CC}$ to a high level, and the system detects the absence of an HDD at the second connector.

Only the Second Connector Is Connected to an HDD

Figure 3:
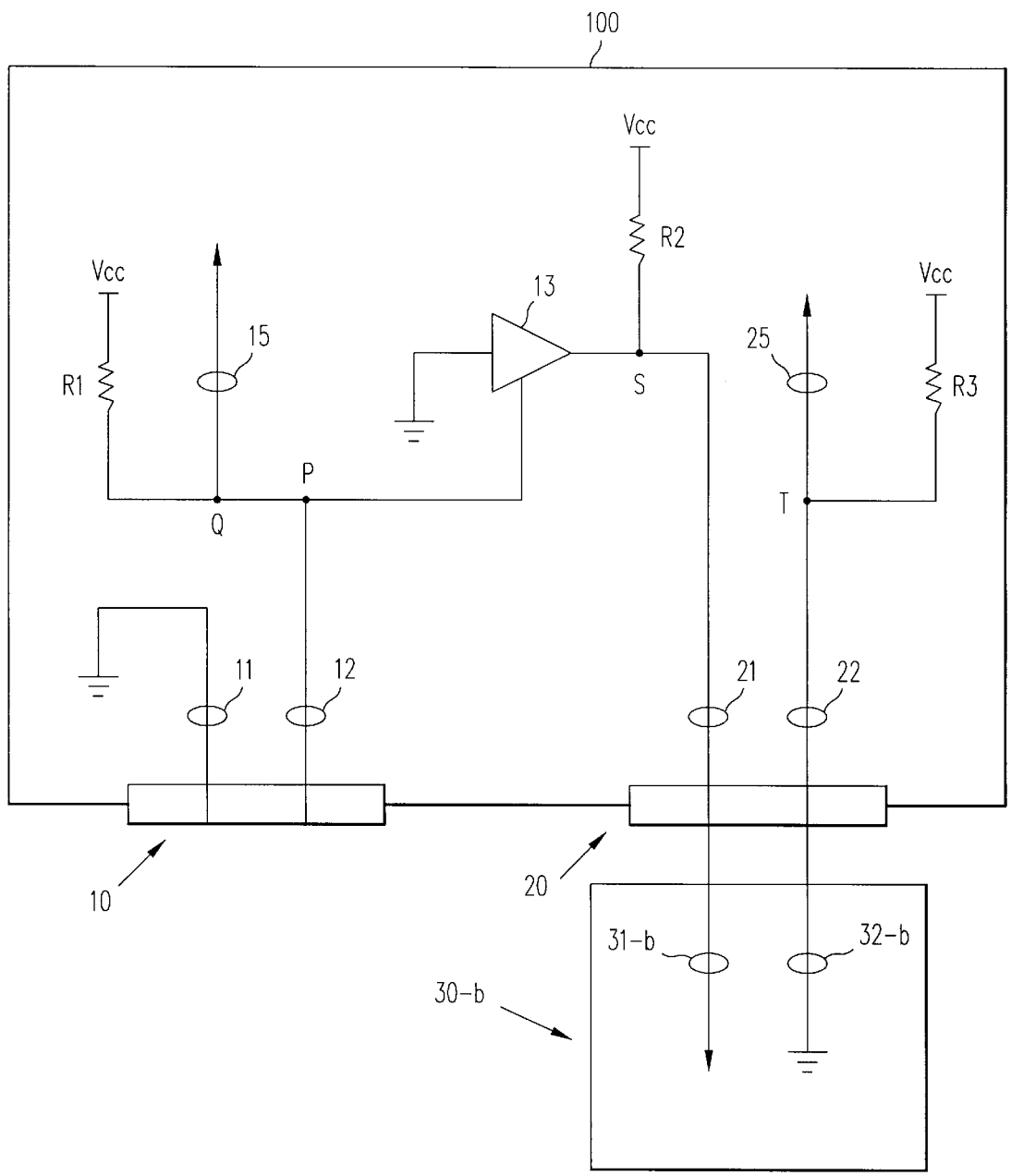
FIG. 3 is a schematic of the present invention when an HDD is connected to a second IDE connector.

FIG. 3 is a schematic showing an HDD 30-b connected to the second connector 20 and no HDD connected to the first connector 20. Because the first DETECT pin 12 is open, the first detection signal line 15 is pulled up by voltage $V_{CC}$ to a high level. Therefore, the system detects the absence of an HDD at the first connector. In response to the high level of the first DETECT pin 12, the buffer 13 is set to the ON condition. Consequently, the second –M/S pin 21 is grounded and the DETECT pin 31-b of the HDD 30-b is low. Therefore, the HDD 30-b acknowledges itself as a master when the power is turned on. In other words, it is ensured that only the connected HDD 30-b is designated as master. The second DETECT pin 22 is grounded via DETECT pin 32-b. Therefore, the second detection signal line 25 is low, and the system detects the presence of the HDD 30-b at the second connector.

Both Connectors Connect to HDDs

Figure 4:
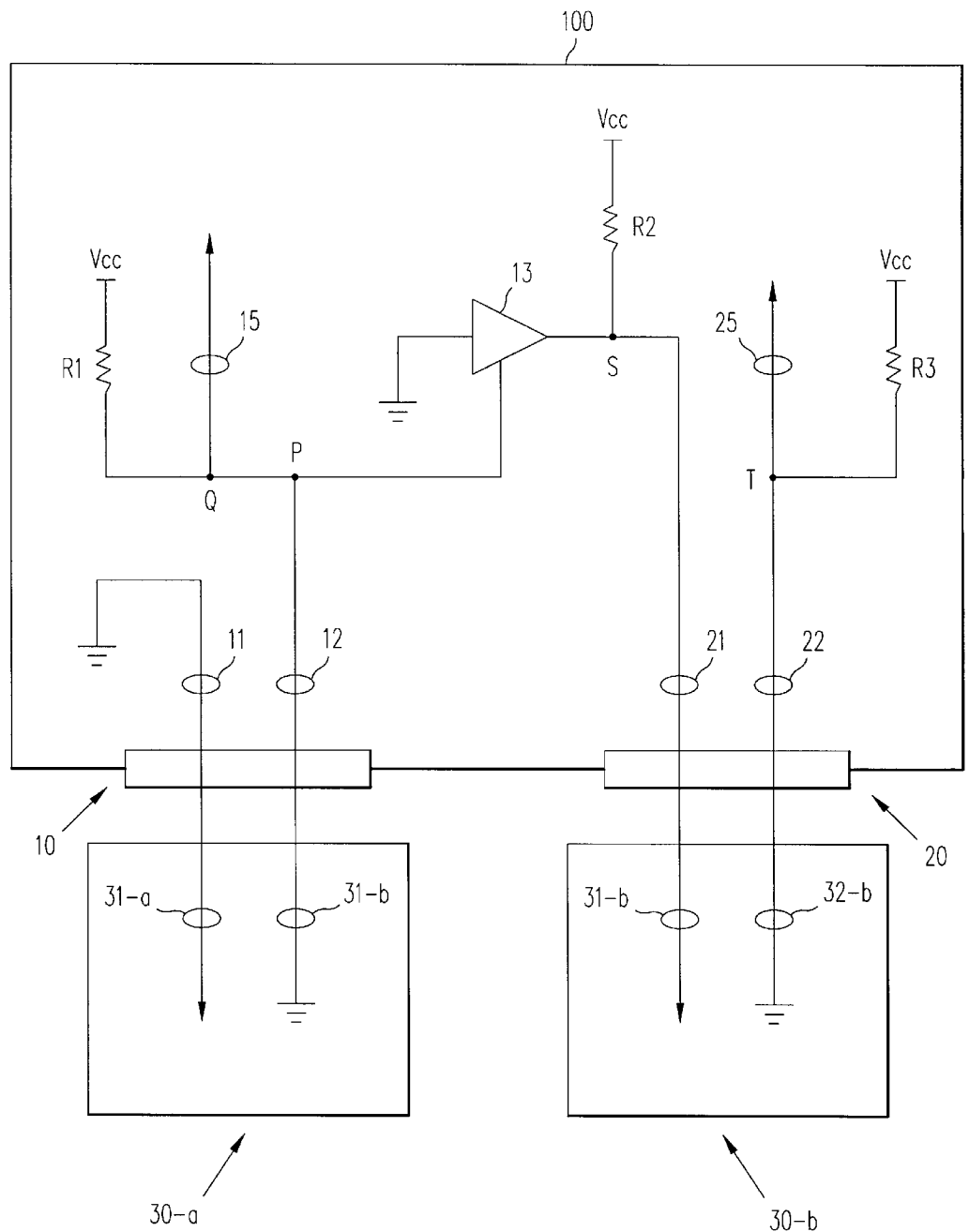
FIG. 4 is a schematic of the present invention when HDDs are connected to the first and the second IDE connectors.

FIG. 4 is a schematic showing HDDs 30-a and 30-b connected to the first and second IDE connectors 10 and 20, respectively. The −M/S pin 31-a of the HDD 30-a is grounded via the first −M/S pin 11. Therefore, the HDD 30-a can acknowledge itself as master when the power is turned on. Because DETECT pin 32-a grounds the first DETECT pin 12, the first detection signal line 15 is low, and the system detects the presence of the HDD 30-a. Because the first DETECT pin 12 is grounded, the buffer 13 is set to the OFF condition. Consequently, the second −M/S pin 21 continues to be pulled up by voltage $V_{CC}$, and a high level signal is provided to the −M/S pin 31-b of the HDD 30-b. Therefore, the HDD 30-b acknowledges itself as a slave when the power is turned on. In other words, only the HDD 30-a connected to the first connector has priority and is a master. DETECT pin 32-b grounds the second DETECT pin 12. Consequently, the second detection signal line 25 goes low, and the system detects the presence of the HDD 30-b at the second connector.

Therefore, the present invention avoids the problems of the prior art in which: the only HDD is a slave HDD, both HDDs are masters, or both HDDs are slaves. The present invention connects a plurality of hard disk drives that acknowledge themselves as either a master or slave in response to a control signal, and designates a hard disk drive as either a master or slave without placing and additional burden on a user. The hard disk drives may also conform to IDE standards. Furthermore, the present invention automatically and accurately designates a hard disk drive as either a master or slave in response to the connection context when power is turned on.

C. Extensions

The present invention has been described in detail while referring to a specific embodiment. However, the invention is not meant to be limited to a specific embodiment. It will be apparent to those of ordinary skill in the art that various modifications or revisions of the embodiment are within the scope of the present invention.

Although the invention was described using an HDD, any peripheral device having an IDE interface may be used. In addition, the interface standard is not meant to be limited to the IDE standard. Other standards, which can connect a plurality of peripheral devices to serve either as masters or slaves, can be used. Therefore, to fully understand the scope of the present invention, the claims should be referred to.

We claim:

1. An information processing apparatus comprising:

first and second connectors; and master/slave designation means, coupled to the first and the second connectors, for providing a control signal to designate a first peripheral device as master, wherein the master/slave designation means designates the first peripheral device as master when the first peripheral device is connected to the second connector and no peripheral device is connected to the first connector.

2. The information processing apparatus of claim 1, wherein the first connector comprising a first master/slave control pin being maintained at a first voltage level for designating a peripheral device connected to the first connector as master, and the second connector comprising a second master/slave control pin being maintained at the first voltage level when no peripheral device is connected to the first connector, and being maintained at a second voltage level when a peripheral device is connected to the first connector for designating a second peripheral device connected to the second connector as a slave.

3. An information processing apparatus, comprising:

a first connector, for connecting a peripheral device, comprising a plurality of connector pins including a first master/slave control pin, the first master/slave control pin being maintained at a first voltage level;

a second connector, for connecting a peripheral device, comprising a plurality of connector pins including a second master/slave control pin;

detection means for detecting whether a peripheral device is connected to the first connector; and master/slave designation means for maintaining the second master/slave control pin at the second voltage level when a hard disk drive is connected to the first connector, and maintaining the second master/slave control pin at the first voltage level when no hard disk drive is connected to the first connector.

4. The information processing apparatus of claim 3, wherein the peripheral device is a hard disk drive.

5. The information processing apparatus of claim 3, wherein the connectors conform to the Integrated Device Electronics (IDE) standards.

6. A method for designating a peripheral device as master in a system having a first connector having a first master/slave control pin and a second connector having a second master/slave control pin, comprising the steps of:

maintaining the first master/slave control pin at a first voltage level;

detecting whether a peripheral device is connected to the first connector; and maintaining the second master/slave control pin at a second voltage level when a hard disk drive is connected to the first connector, and maintaining the second master/slave control pin at the first voltage level when no hard disk drive is connected to the first connector.

7. The information processing apparatus of claim 6, wherein the peripheral device is a hard disk drive.

8. The information processing apparatus of claim 6, wherein the connectors conform to the Integrated Device Electronics (IDE) standards.

9. The information processing apparatus of claim 6, wherein the first voltage level is a ground level voltage and the second voltage level is obtained by a connection through a resistor to a high-level voltage source.

* * * * *